(12) United States Patent
Swanson

(10) Patent No.: US 8,214,181 B2
(45) Date of Patent: *Jul. 3, 2012

(54) METHOD FOR GENERATING A MODEL REPRESENTATIVE OF A PROCESS

(76) Inventor: Brian G. Swanson, West Bloomfield, MI (US)

( * ) Notice: Subject to any disclaimer, the term of this patent is extended or adjusted under 35 U.S.C. 154(b) by 878 days.

This patent is subject to a terminal disclaimer.

(21) Appl. No.: 12/228,001

(22) Filed: Aug. 8, 2008

(65) Prior Publication Data

US 2009/0076740 A1 Mar. 19, 2009

Related U.S. Application Data

(62) Division of application No. 11/384,077, filed on Mar. 17, 2006, now Pat. No. 7,421,348.

(60) Provisional application No. 60/663,461, filed on Mar. 18, 2005.

(51) Int. Cl.
*G06F 7/60* (2006.01)
*G06F 17/10* (2006.01)

(52) U.S. Cl. ..................... 703/2; 703/6; 703/13

(58) Field of Classification Search .............. 703/2, 6, 703/13; 702/22, 32
See application file for complete search history.

(56) References Cited

U.S. PATENT DOCUMENTS

| | | |
|---|---|---|
| 4,161,883 A | 7/1979 | Laird et al. |
| 4,584,654 A | 4/1986 | Crane |
| 4,858,147 A | 8/1989 | Conwell |
| 4,884,217 A | 11/1989 | Skeirik et al. |
| 4,907,167 A | 3/1990 | Skeirik |
| 4,910,691 A | 3/1990 | Skeirik |
| 4,920,499 A | 4/1990 | Skeirik |
| 4,922,412 A | 5/1990 | Lane et al. |
| 4,928,484 A | 5/1990 | Peczkowski |
| 4,965,742 A | 10/1990 | Skeirik |
| 4,972,363 A | 11/1990 | Nguyen et al. |
| 4,979,126 A | 12/1990 | Pao et al. |
| 5,006,992 A | 4/1991 | Skeirik |
| 5,023,045 A | 6/1991 | Watanabe et al. |
| 5,025,499 A | 6/1991 | Inoue et al. |
| 5,038,269 A | 8/1991 | Grimble et al. |
| 5,058,043 A | 10/1991 | Skeirik |
| 5,088,314 A | 2/1992 | Takashi |
| 5,113,483 A | 5/1992 | Keeler et al. |
| 5,119,287 A | 6/1992 | Nakamura et al. |
| 5,119,468 A | 6/1992 | Owens |
| 5,121,467 A | 6/1992 | Skeirik |
| 5,142,612 A | 8/1992 | Skeirik |
| 5,150,682 A | 9/1992 | Magnet |
| 5,167,009 A | 11/1992 | Skeirik |

(Continued)

*Primary Examiner* — Kandasamy Thangavelu
*Assistant Examiner* — Luke Osborne
(74) *Attorney, Agent, or Firm* — L. C. Begin & Associates, PLLC

(57) ABSTRACT

A method for generating a model representative of a process. The process includes a result variable representing a product of the process, and a plurality of process variables representing characteristics of the process other than the product of the process. The method includes steps of acquiring a plurality of test values of the result variable; acquiring, for each process variable of the plurality of process variables, a plurality of test values of the process variable, each test value being associated with a result variable value; providing, for each first coefficient of a plurality of first coefficients, a separate test value of the first coefficient associated with each process variable; and, for each second coefficient of a plurality of second coefficients, providing a separate test value of the second coefficient associated with each test value of each process variable.

23 Claims, 9 Drawing Sheets

U.S. PATENT DOCUMENTS

| | | | | |
|---|---|---|---|---|
| 5,175,678 | A | 12/1992 | Frerichs et al. | |
| 5,197,114 | A | 3/1993 | Skeirik | |
| 5,212,765 | A | 5/1993 | Skeirik | |
| 5,222,403 | A | 6/1993 | Angelini et al. | |
| 5,231,939 | A | 8/1993 | Tanaka et al. | |
| 5,251,285 | A | 10/1993 | Inoue et al. | |
| 5,280,756 | A | 1/1994 | Labbe | |
| 5,282,261 | A | 1/1994 | Skeirik | |
| 5,311,421 | A | 5/1994 | Nomura et al. | |
| 5,353,207 | A | 10/1994 | Keeler et al. | |
| 5,353,267 | A | 10/1994 | Katayama | |
| 5,386,373 | A | 1/1995 | Keeler et al. | |
| 5,408,586 | A | 4/1995 | Skeirik | |
| 5,477,444 | A | 12/1995 | Bhat et al. | |
| 5,479,573 | A | 12/1995 | Keeler et al. | |
| 5,539,638 | A | 7/1996 | Keeler et al. | |
| 5,539,639 | A | 7/1996 | Devaud et al. | |
| 5,548,528 | A * | 8/1996 | Keeler et al. | 702/22 |
| 5,559,690 | A | 9/1996 | Keeler et al. | |
| 5,570,282 | A | 10/1996 | Hansen et al. | |
| 5,613,041 | A | 3/1997 | Keeler et al. | |
| 5,625,750 | A | 4/1997 | Puskorius et al. | |
| 5,640,493 | A | 6/1997 | Skeirik | |
| 5,682,317 | A | 10/1997 | Keeler et al. | |
| 5,703,777 | A | 12/1997 | Buchhop et al. | |
| 5,704,111 | A | 1/1998 | Johnson et al. | |
| 5,729,661 | A | 3/1998 | Keeler et al. | |
| 5,734,796 | A | 3/1998 | Pao | |
| 5,768,475 | A | 6/1998 | Godbole et al. | |
| 5,781,432 | A | 7/1998 | Keeler et al. | |
| 5,818,953 | A | 10/1998 | Queisser et al. | |
| 5,819,006 | A | 10/1998 | Keeler et al. | |
| 5,825,646 | A | 10/1998 | Keeler et al. | |
| 5,826,249 | A | 10/1998 | Skeirik | |
| 5,842,189 | A | 11/1998 | Keeler et al. | |
| 5,848,402 | A | 12/1998 | Pao et al. | |
| 5,859,773 | A | 1/1999 | Keeler et al. | |
| 5,933,345 | A | 8/1999 | Martin et al. | |
| 5,950,182 | A | 9/1999 | Godbole et al. | |
| 5,970,426 | A | 10/1999 | Mandel et al. | |
| 6,002,839 | A | 12/1999 | Keeler et al. | |
| 6,047,221 | A | 4/2000 | Piche et al. | |
| 6,134,537 | A | 10/2000 | Pao et al. | |
| 6,144,952 | A | 11/2000 | Keeler et al. | |
| 6,169,980 | B1 | 1/2001 | Keeler et al. | |
| 6,212,509 | B1 | 4/2001 | Pao et al. | |
| 6,216,048 | B1 | 4/2001 | Keeler et al. | |
| 6,243,696 | B1 | 6/2001 | Keeler et al. | |
| 6,278,899 | B1 | 8/2001 | Piche et al. | |
| 6,314,414 | B1 | 11/2001 | Keeler et al. | |
| 6,363,289 | B1 | 3/2002 | Keeler et al. | |
| 6,381,504 | B1 | 4/2002 | Havener et al. | |
| 6,591,254 | B1 | 7/2003 | Keeler et al. | |
| 6,690,462 | B2 | 2/2004 | Selzer | |
| 6,694,796 | B2 | 2/2004 | Juneau et al. | |
| 6,732,055 | B2 * | 5/2004 | Bagepalli et al. | 702/32 |
| 6,757,619 | B2 | 6/2004 | Zison et al. | |
| 6,810,358 | B1 | 10/2004 | Lang et al. | |
| 6,882,929 | B2 | 4/2005 | Liang et al. | |
| 6,912,889 | B2 | 7/2005 | Staphanos et al. | |
| 6,954,701 | B2 | 10/2005 | Wolfe | |
| 6,975,975 | B2 | 12/2005 | Fasca | |
| 6,983,640 | B1 | 1/2006 | Staphanos et al. | |
| 7,068,817 | B2 | 6/2006 | Bourg et al. | |
| 7,233,910 | B2 | 6/2007 | Hileman et al. | |
| 2002/0010563 | A1 * | 1/2002 | Ratteree et al. | 703/2 |

* cited by examiner

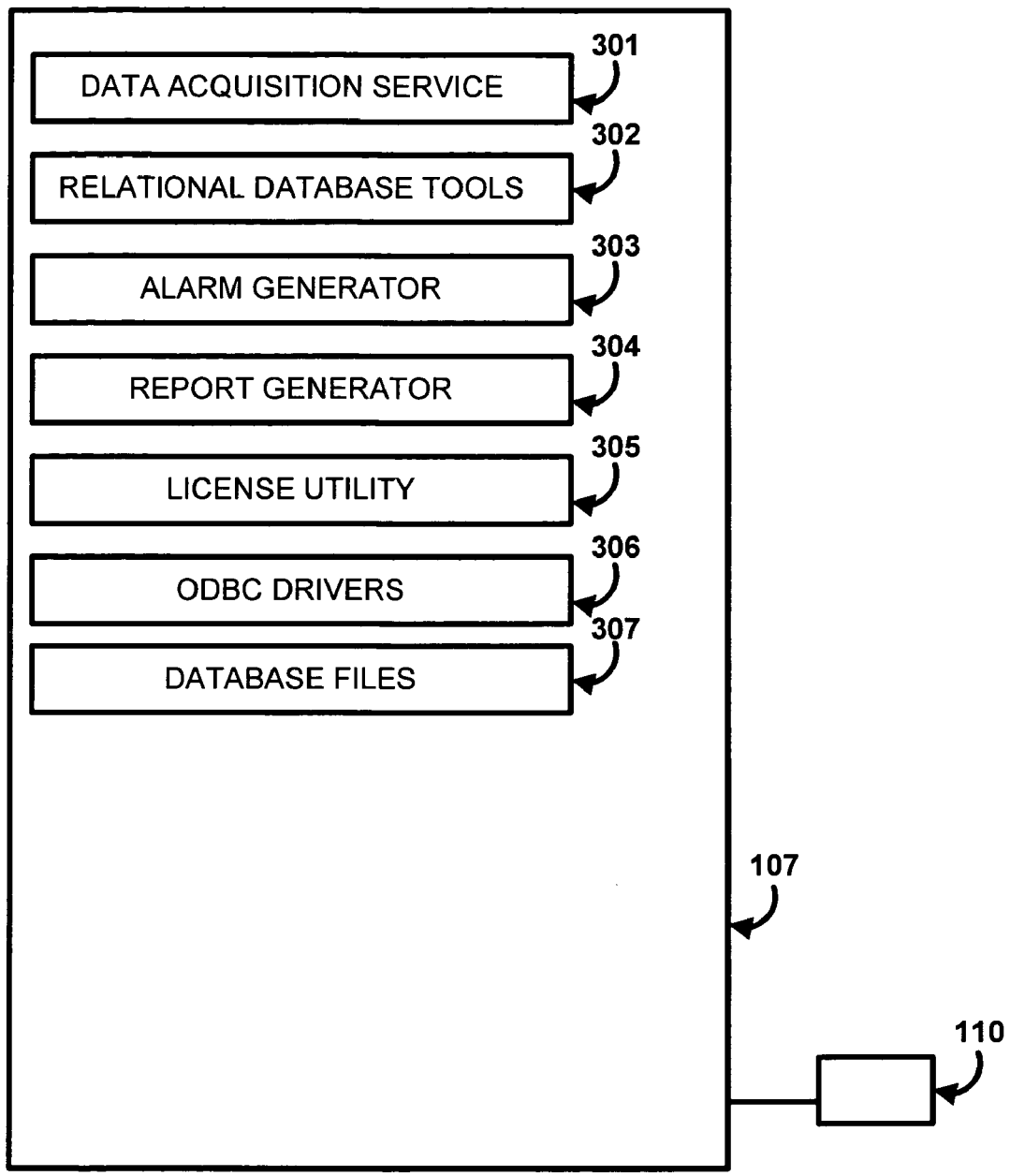

Fig. 3A

| Simple Process Vector (Record in table History Data THD) | | | | |
|---|---|---|---|---|
| DateTimeStamp | Input1 | Input2 | ... | InputN |
| 38013.3867 | 1.234 | 2.345 | | 9.999 |
| | | | | |

Fig. 3B

| Historical Training Data (Record in table Master Data TMD) | | | | | | | | |
|---|---|---|---|---|---|---|---|---|
| ID | TSLU | Input1 | Input2 | ... | InputN | Input1Delta | Input2Delta | ... | InputNDelta |
| 1 | 0 | 1.234 | 2.345 | | 9.999 | 1.234 | 2.345 | | 9.999 |

Figure 6: time plot of predicted and measured NOx emissions
(Example: 170 MW Combined Cycle Gas Turbine Figure 7: xy plot of predicted and measured NOx emissions (Example 170 MW Combined Cycle Gas Turbine)

Figure 8: time plot of differences between predicted and measured NOx emissions
(Example: 170 MW Combined Cycle Gas Turbine)

Fig. 9

| Predicted NOx ppmv Channel | = 19.8 |
| Predicted Oxygen % Channel | = 15.1 |
| F Factor = 8710 (scf per mmBTU) | = 8710 |
| Emission Constant (1.194 E-7 lbs / scf ppmv) | = 0.0000001194 |

⬇

| Predicted Emission Rate (lbs per mmBTU) | = 0.074 |

NOx (lbs/mmBTU) =
$E_{ppmv}$ x F Factor x Emission Constant x 20.9 / (20.9 − Oxygen %)
from Eq. 19-1 (U.S. EPA Method 19)

= 19.8 x 8710 x 0.0000001194 x 20.9 / (20.9 − 15.1)
= 0.074

METHOD FOR GENERATING A MODEL REPRESENTATIVE OF A PROCESS

CROSS REFERENCE TO RELATED APPLICATIONS

This application is a divisional of U.S. application Ser. No. 11/384,077, which was filed on Mar. 17, 2006 and which issued on Sep. 2, 2008 as U.S. Pat. No. 7,421,348. U.S. application Ser. No. 11/384,077 claims the benefit of U.S. Provisional Application No. 60/663,461, filed on Mar. 18, 2005.

REFERENCE TO A COMPUTER PROGRAM LISTING APPENDIX

A compact disc and a duplicate copy thereof (a total of two (2) compact discs) containing a computer program listing appendix are being filed with this application. The contents of the compact disc are incorporated into this application by reference. Per 37 CFR 1.52(e)(5), the files contained on the compact disk, along with their dates of creation and file sizes (in bytes), is listed as follows:

| CMCpatentPEMSsql2.txt | 17 kb | Aug. 7, 2008 |
| CMCpatentReadMe.txt | 1 kb | Aug. 7, 2008 |

FIELD OF THE INVENTION

The present invention relates to the monitoring and control of processes and to predictive models for their behavior, and more particularly, to a process-monitoring and control system and method for predicting a process or emissions parameter of an operating emissions source.

BACKGROUND OF THE INVENTION

Public awareness has increased with respect to the environment, and primary pollutants such as nitrogen oxides and sulfur dioxide are currently regulated in most industries, either under 40 CFR Part 60 or 40 CFR Part 75. It is the responsibility of the federal Environmental Protection Agency and the individual states to enforce these regulations. A great deal of attention in recent years has been spent on addressing the monitoring requirements of these regulations, in order to minimize the discharge of noxious gases into the atmosphere by industrial facilities.

One technique for ensuring correct monitoring of noxious gases has been to implement continuous emissions monitoring systems (CEMS). These systems are utilized to monitor emissions of sulfur dioxide, nitrogen oxides, carbon monoxide, total reduced sulfur, opacity, volatile hydrocarbons, particulate, and heavy metals such as mercury. Typically, a CEMS is installed in the plant at each emissions source. Applicable Federal, state, and local regulations include certain options for continuous monitoring of each of these emissions sources, and regulatory agencies are provided with a monitoring plan for each plant that details how the emission rate is to be measured and reported prior to startup.

A CEM system typically includes either an in situ analyzer installed directly in an exhaust stack, the exhaust pipe of the reciprocating engine, or in an extractive system which extracts a gas sample from the exhaust stack and conveys it to an analyzer at grade level. Continuous emissions monitoring system components such as gas analyzers are quite expensive, difficult to maintain, and difficult to keep properly calibrated. As such, the regulations that deal with a CEM system require the analyzers to be calibrated periodically and subjected to other quality assurance programming to ensure the accuracy and reliability of the compliance data.

In many cases, the regulations allow for certification and operation of alternatives to the hardware-based continuous emissions monitoring system. Such alternatives include software solutions that predict the emissions from available process and ambient parameters. Procedures for certifying these predictive emissions monitoring systems (PEMS) are detailed in the regulations, namely 40 CFR Part 75, Subpart E and 40 CFR Part 60, Appendix B, Performance Specification 16. Generally, a PEM system models the source of emissions that generates the emissions and predicts the quantity of emissions that are produced given the operating state of the process.

Regulations allow a maximum downtime of ten percent for calibration. If a unit remains in operation greater than ten percent of the time with the CEMS down, the emissions level is considered by the regulators to be at maximum potential level. This results in out-of-compliance operation and over-reporting of emissions. Facilities must maintain and operate their gas analyzers to avoid penalties requiring an ongoing operational expense and, occasionally, emergency services are required. A reliable software-based PEMS that can be certified under 40 CFR Part 75, Subpart E would represent an extremely cost-effective option of the compliance monitoring needs of industrial facilities.

There have been PEM systems built in the past to predict various combustion and emission parameters from continuous industrial processes and to calculate process or combustion efficiency for compliance reporting and process optimization purposes. Typically, the PEM system is "trained" by monitoring multiple inputs such as pressures, temperatures, flow rates, etc., and one or more output parameters such as $NO_x$, $CO$, $O_2$, etc. After training, in normal operation, the PEM system monitors only the multiple inputs and calculates estimated output parameter values that closely match the actual pollutant levels. Methodologies used in the past include nonlinear statistical, neural network, eigenvalue, stochastic, and other methods of processing the input parameters from available field devices and to predict process emission rates and combustion or process efficiency. For the most part, these PEM systems are complicated, relatively costly, and or difficult to implement. These systems also typically require retraining with the support of specialized staff from the system provider to adjust the proprietary model to the real-world conditions encountered in the field.

SUMMARY OF THE INVENTION

In accordance with the present invention, a computer system is provided including computer readable program code means adapted to perform a method for generating a model representative of a process, the process including a result variable representing a product of the process, and a plurality of process variables representing characteristics of the process other than the product of the process.

BRIEF DESCRIPTION OF THE DRAWINGS

In the drawings illustrating embodiments of the present invention:

FIG. 2 illustrates a block diagram of a PEMS computing system in accordance with one embodiment of the present invention;

FIG. 3A shows a file structure describing values of a process variable and associated coefficients, in accordance with the present invention;

FIG. 3B shows a file structure of a master data table in accordance with the present invention;

FIG. 9 illustrates an overall view of the data flow for compliance.

DETAILED DESCRIPTION

Figure 1:
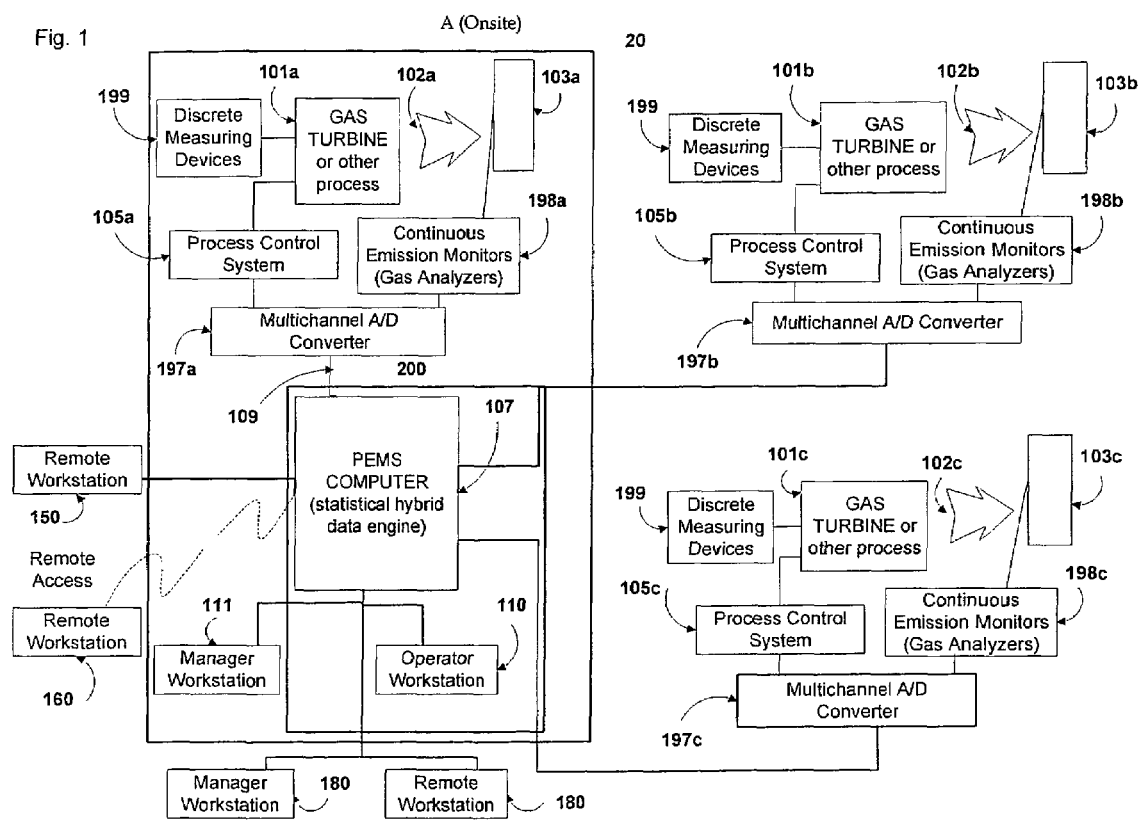
FIG. 1 illustrates an overall block diagram of an emissions monitoring system in accordance with the present invention.

FIG. 1 is a schematic diagram of a system 20 in accordance with the present invention for monitoring, predicting, and controlling system process variables and emissions in one or more continuous or batch processes and/or emissions sources. The system shown in FIG. 1 is configured for centralized monitoring and management of multiple processes or emissions sources. Referring to FIG. 1, emissions source(s) 101(a)-(c) each run in a continuous or batch process which utilizes raw materials (for example, coal or fuel oil) to produce a measurable output (energy or other products). Emission sources 101(a)-(c) can take any form including reciprocating diesel engines, reciprocating gas engines, gas turbines, steam turbines, package boilers, waste heat boilers, solar-based generators, wind-based generators, fuel-cell based generators, or any other devices that are capable of transforming any form of potential energy into electricity while exhausting pollutant emissions 102 to the atmosphere through one or more corresponding stack(s) or duct(s) 103a-c. In FIG. 1, emissions source 101a and associated elements of system 20 are shown enclosed in a box A to indicate that these components are located onsite at a power generation facility or other facility. Elements of system 20 outside of box A may be sited at nearby or remote locations with respect to emissions source 101a, and may be configured to interface with a PEMS computer 107 (as described below) located onsite proximate emissions source 101a. Alternatively, PEMS computer 107 may be located remotely from any of emissions sources 101a-101c.

System 20 also uses a novel method for predicting the values of process and emissions variables based on the historical values of the process and emissions variables. The method may be used to generate a computer-implemented predictive model for predicting the values of the system process variables and/or emissions variables. The method for predicting the values of the process and emissions variables may be implemented manually. Alternatively, any or all of the steps relating to prediction of the variable values and any or all of the steps relating to generation of the model may be implemented by or with the aid of one or more computing devices.

Process and emissions data used to generate the predictive model may be acquired in any of several ways. In the embodiment shown in FIG. 1, process parameter data (for example, temperature or pressure values) relating to a given emissions source 101a is measured by an associated process control system 105a. In addition to process control system 105a or as an alternative to the process control system, the process data or specific portions thereof may be obtained by discrete measuring devices 199 positioned at various locations along the process stream. Process control system 105a or discrete measuring devices 199 can measure such process parameters as temperature, pressure, differential pressure, and mass flow. It is understood that the actual process variables measured by the measuring devices will depend on the process in question.

In the embodiment shown in FIG. 1, emissions data are measured by an associated continuous emissions monitoring system (CEMS), generally designated 198a, which is coupled to the emissions source. The elements and capabilities of existing CEM systems are well-known, and will not be discussed in great detail herein. Typically, CEM system 198a extracts or receives emissions samples from an associated emission source 101a and analyzes the samples for constituent components. Based upon the analysis of such components, information can be obtained about the process which generates the emissions. Once this information is known, various process parameters can be adjusted or modified in order to optimize the process and/or modify the generated emissions.

In addition to process CEM system 198a or as an alternative to CEM system 198a, the emissions data or specific portions thereof may be obtained using discrete measuring devices 199a positioned at various locations within or around the emissions source. Depending on the process in question, CEM system 198a or discrete measuring devices 199a can measure such emission characteristics as oxides of nitrogen, oxides of carbon, unburned fuel in the emission stream, emission volume, emission heat, emission noise, etc.

It is understood that the actual emission variables measured by the measuring devices will depend on the process in question. Devices ands systems for measuring gaseous emissions are commercially available from any of a variety of sources, for example Horiba Instruments, Inc., of Irvine, Calif. Also, instrumentation and measurement devices to be used in the collecting data for use in generating the predictive model may be subject to quality controls pursuant to local regulatory requirements and any site quality assurance programs.

Referring again to FIG. 1, one or more onsite manager stations 111 and one or more onsite operator stations 110 are connected to elements of system 20 to enable a variety of operational and maintenance-related functions, including real-time monitoring of process and emissions variables, monitoring of data quality control activity, system configuration, the generation of process control commands, response to system alarms, analysis of process and emissions data, and any of a variety of additional functions. Also, these same functions may be performed remotely via a laptop computer or other suitable system interface device. A remote terminal 150 may access system 20 over an internet connection 149, and a wireless connection may enable access by another remote terminal 160.

The steps described herein relating to generation of the predictive model of the present invention may be executed manually. However, to greatly increase the speed, efficiency, and flexibility with which the predictive model is generated, tested, and utilized, and to facilitate use of the information generated by the model for a variety of purposes, generation of the predictive model and attendant functions such as the acquisition of process and emissions data may be implemented by one or more computer software elements designed to coordinate and execute specified functions related to generation, testing, and employment of the predictive model.

Referring again to FIG. 1, in the computer-assisted implementation of the method, historical process and emissions data is gathered and ultimately conveyed to a PEMS computing system, generally designated 200, where operations are performed on the gathered data and where the predictive model is generated and implemented. A wired or wireless local area network (LAN) 109 connects PEMS computing system 200 with process and emissions monitoring systems 198 and 105, with operator workstations 110, with supervisor workstations 111, and with any other elements of system 20 as desired. PEMS computing system 200 may be coupled to process control system 105, discrete measuring devices 199, and CEM system 198 for receiving process and emissions data via one or more serial ports, via a serial peripheral interface (SPI), a serial communications interface (SCI), or via another suitable communications interface.

FIG. 2 shows a more detailed view of one embodiment of the of PEM computing system 200. In the embodiment shown in FIGS. 1 and 2, PEMS computing system 200 includes at least a personal computer or laptop computer 107 along with a display or workstation 110 and suitable user interface devices, for example a keyboard and mouse. PEMS computing system 200 is located onsite at the emissions source(s). The PEMS predictive model is typically generated by and runs locally on a single computing device 107 which provides measured process data, measured emissions data, predicted emission variable values, and a variety of other information to workstation 110 and to the various other local and remote workstations previously described.

In the embodiment shown in FIGS. 1 and 2, the software elements or elements comprising the PEM system of the present invention reside on computing device 107, generally designated the PEMS computing device. In general, computing device 107 includes a processor having a speed of 133 MHz or greater, at least 512 MB of RAM and, preferably, a fault-tolerant hard drive. Examples of suitable computing devices include a personal computer (PC), a laptop computer, an engineering workstation, and a server interfacing with onsite or remotely located client computing devices. As used herein, the term "PEMS computing device" refers to any computing device on which any utility or element of the PEM system software resides. In the embodiment shown in FIG. 2, PEMS computing device 107 contains a data acquisition utility 301, a relational database application 302, an alarm generation utility 303, a report generation utility 304, a license utility 305, ODBC software and drivers 306, and one or more local database files 307.

Referring to FIG. 1, if the process or emissions data requires pre-processing (for example, analog-to-digital conversion) prior to submission to computing device 107, suitable processing hardware and/or software may be incorporated into process control system 105, into computing device 107, or into the data paths between the various data acquisition devices and computing device 107. In the embodiment shown in FIG. 1, a multi-channel analog-to-digital (A/D) converter 197a is incorporated along the data path between controller 105a and PEMS computing device 107 for converting analog values of the process parameters to digital values usable by the computing system. Preferably, A/D converter 197a has a relatively high resolution (20-24 bits or higher) and is used to improve signal-to-noise ratio of the underlying analytical measurements. The signal-to-noise ratio can be measured online and automatically optimized by adjusting digital filter parameters either at initial setup, during auto-calibration, or continuously online. Alternatively, an A/D port installed in PEMS computing device 107 may convert analog values received by device 107 into digital representations of the measured analog data values. Hardware and software for suitable pre-processing of such data and conversion of data formats is known to those skilled in the art and is readily available.

It is understood that CEM systems 198 and/or any discrete measuring devices employed in system 20 may be configured to interface with any other element of system 20 as required. In addition, any operations or steps performed by a user may be performed either onsite or remotely via a remote terminal and a suitable communications interface. Interconnection between the elements of system 20, and onsite and local access to elements of system 20, may be provided via any suitable communications interface, for example, a wired LAN, a wireless LAN, or direct wiring between elements of the system. Also, remote access to system 20 and to individual elements of the process monitoring and control system may be obtained using any of various means, for example internet connectivity, through a wide area network, or through a wireless interface.

It is understood that any or all of the software elements or elements comprising the PEM system of the present invention may be distributed among various interconnected onsite or remotely located computing devices 180, depending on the needs of a particular user or application. It is also understood that a single PEMS computing device 107 may be coupled to multiple emissions sources in order to monitor each source and provide predictive emissions and compliance data for each source.

Those skilled in the art will recognize that the distributed data acquisition, monitoring, and control system illustrated in FIG. 1 facilitates acquisition of process and emissions data and communication of the data to various shared computing resources and user interface devices. The system structure shown also facilitates the performance of such functions as the onsite and/or remote monitoring of process and emissions parameters, the calculation of predicted emissions values, issuance of control commands, and the generation of reports or alarms (if required).

To predict the emissions that will be generated by emissions sources 101a-101c for a given set of process parameters, system 20 uses a predictive model incorporated into a predictive emissions monitoring system (PEMS). The predictive model of the present invention is generated using actual process and emissions data collected during normal operation of the emissions source over a predetermined time period. More specifically, the PEM system uses the historical data collected during normal operation over a predetermined time period as part of a training dataset to generate an empirical model for use in predicting the values of process variables (for example, in an absence of process data due to a failed sensor or other cause) and emissions variables. The accuracy of the resulting predictions is largely dependent upon the range and quality of the training dataset.

Figure 4:
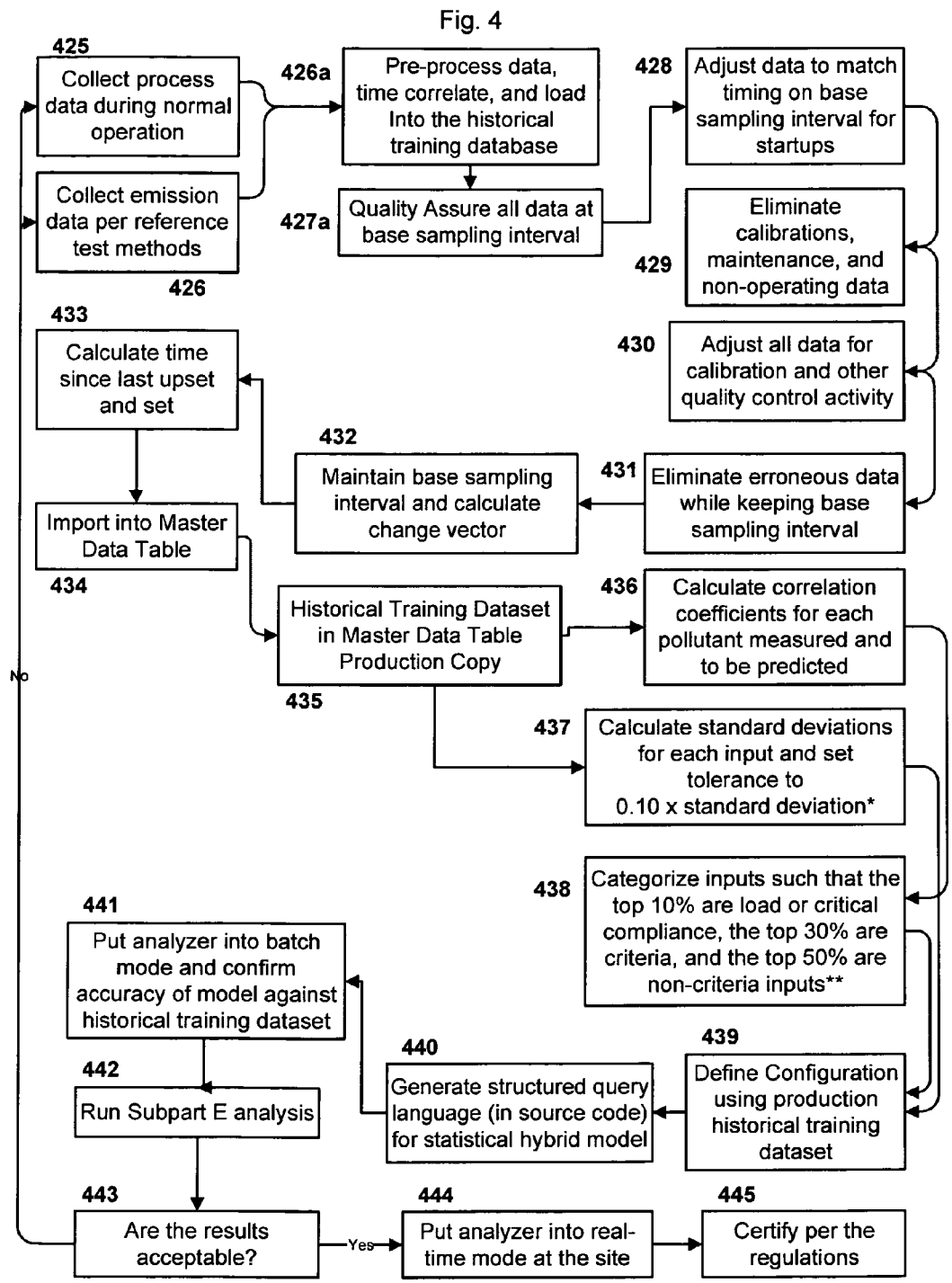
FIG. 4 illustrates a flow diagram for operating the overall system.

FIG. 4 is a process flow diagram showing steps relating to generation of the predictive model. Prior to generation of the predictive model, process data is collected at step 425 and emissions data is collected at step 426 during normal system operation. The process and emissions data are used in generating a historical training dataset for the predictive model. As used herein, the term "process data" refers to any measured values of variables (such as temperature, pressure, volumetric or mass flow rate, etc.) relating to a given process. Similarly, the term "emissions data" refers to any measured values of variables (such as concentrations of specified gases) relating to emissions resulting from an associated process. This first set of process and emissions data provides test data values of the process and emissions variables, for use in generation of the predictive model.

Referring to FIGS. 1 and 4, process variable data (for example, temperature or pressure values) relating to a given emissions source 101 is collected by process control system 105 and/or by discrete measuring devices 199 operatively coupled to the process stream. Process control system 105, discrete measuring devices 199, and CEM system 198 may be actively polled for real-time data, or a manually-generated or automated request may be sent by from an onsite or remote system access node (for example, operator terminal 110) to provide real-time process parameter data. Similarly, emissions data is collected by CEM system 198 and/or by discrete measuring devices 199 positioned at various locations within or around the emissions source(s).

The process and emissions data is collected over a predetermined time period and is characterized according to such features as data type (for example, temperature, pressure), data source (i.e., the particular field operating device from which the data was received), and minimum and maximum values of the data from a given source. The collected process data and emissions data are then pre-processed in step 426a, if required. For example, it may be necessary to convert analog data provided by the measuring instruments to digital data manipulable by digital computing devices, if the data quality assurance methods and/or other operations to be performed on the data are computer-assisted.

Data values are measured at a base sampling interval (BSI) which is determined according to a known response time of an emissions variable to a change in a process variable. A finite amount of time is required for a change in the process to affect the emissions. For processes which produce gaseous emissions, the length of this time period generally depends on such factors as the exhaust gas path and the sampling location. For most industrial processes, at least a minute is required for a change in a process variable to change the emissions as measured. For most boilers, for example, the BSI is set to approximately one minute. For gas turbines, the BSI can range anywhere from approximately 1 minute (in large units) to 10 seconds or less (for smaller units). For some high-speed industrial processes such as arc welding, the BSI may be set below 1 second. Each measured data value is addressed and labeled for reference purposes. In a computer-assisted implementation of the method, the labeled data is then incorporated into one or more records in a relational database.

Referring to FIGS. 1 and 2, in a computer-assisted implementation of the method, process and emissions data from CEM system 198a and/or discrete measuring instruments 199a is received by a data acquisition element 301 residing in PEMS computing device 107. Data acquisition element 301 is configured to query and to enable querying of CEM system 198a and/or discrete measuring devices 199a for associated process and emissions data. Data acquisition element 301 may be configured by a user to a variety of operational modes. For example, element 301 may be programmed to query CEM system 198a or measuring devices 199a upon startup or activation of the PEM system, upon receipt of a command from a user at PEM computing device 107, or automatically on a regular basis at predetermined intervals. In other modes of operation, element 301 may receive process and/or emissions data forwarded automatically at predetermined intervals by CEM system 198a or devices 199a or in response to a query initiated from a user at a remote computing device. Other operating modes and events resulting in transmission and receipt of process and emissions data are also contemplated.

In step 426a, the measured process and emissions data is also structured into one or more records in a relational database which define a raw data database. Compilation and organization of the data may be accomplished by a portion of the PEMS application, or the compilation and organization may be accomplished using another, commercially available application, such as Microsoft® ACCESS, dBase™, DB2, a standard spreadsheet program such as Microsoft® Excel, or another suitable database platform. However, any database platform used to structure the gathered data is preferably accessible using Open Database Connectivity (ODBC) programming statements, or using programming statements conforming to a comparable standard that permits querying of the database using Structured Query Language (SQL) requests.

In the computer-implemented embodiments discussed herein, interaction between the relational database(s) of the present invention and interaction between a user and the databases is conducted using Structured Query Language (SQL) requests. These requests may, for example, may be formulated as required, previously structured into SQL programming segments, or may be previously embedded in applications programs or other programs.

As known in the art, the SQL requests are processed by the database management system (DBMS), which retrieves requested data elements from the relational database and forwards the data to the requesting entity, for example a human operator located at an onsite or remote system access point. Storage of the process and emissions data and information associated with the data in relational database(s) and the use of SQL statements to interact with the database(s) provides operators or other system users with enormous speed and flexibility with regard to accessing and manipulating the stored data. For example, a user can define the organization of the data, determine relationships between the data elements, conduct searches for data elements meeting user-defined criteria, and dynamically modify the database by rearranging elements, adding elements, removing elements, and changing the values of existing data elements.

Interaction between the relational database(s) of the present invention may also be conducted using Dynamic SQL statements, which facilitate the automatic generation of queries. Such statements can be entered by a user or programmer, or they may be generated by a program.

In the embodiments described herein, PEMS computing device 107 interfaces with process control system 105a, discrete measuring devices 199a, and other elements of system 20 via a set of standard data interfaces known as Object Database Connectivity (ODBC). As is known in the art, ODBC translates an SQL request into a request the database system understands, thereby enabling the database to be accessed without knowing the proprietary interface of a given database application. The ODBC or other interface software and associated drivers for accessing the process and emissions data files application are incorporated into the computing device on which the database is stored and on any remote computing devices through which database access may be requested.

Separate data streams from different process or emissions monitoring devices may be entered into different database applications, depending on such factors as the equipment being used and the geographic locations of the emissions sources. Preferably a single type of database platform is used to store process and emissions data for each emissions source. Alternatively, the raw data may be retained in memory in one of various alternative file formats for further manipulation prior to incorporation into a database. Formatting of the data is generally undertaken (in conjunction with the chosen database application) by the data acquisition element of the software, but may alternatively be accomplished by another portion of the PEMS program if so desired.

Returning to FIG. 4, in step 427, the emissions data and process data are time-correlated such that there is a record for all values of each variable for each base sampling interval. This provides a common temporal reference frame for all measured data values.

In step 427a, the raw data from CEM system 198 and/or measuring devices 199 is quality assured per 40 CFR Part 60, Appendix A, incorporated herein by reference. The data may be quality assured either manually or using automated methods. Data values measured during a period of calibration are replaced with process data from surrounding records (if appropriate) or flagged for removal from the data set. Data that will be retained for further analysis is adjusted for bias and drift.

In step 428, the raw data is adjusted to match the timing of the base sampling interval.

In step 429, all calibration data (data obtained and used for calibrating field devices 104), maintenance data (data obtained during emissions source maintenance period or procedures), and non-operating data (such as data obtained when the emissions source is offline) are eliminated.

In steps 430 and 431, the data is analyzed in accordance with procedures outlined in 40 CFR parts 60 and 75, incorporated herein by reference. Calibration adjustments are made and erroneous or invalid data is otherwise eliminated.

As stated previously, the steps for generating the predictive model of the present invention may be executed manually. However, to greatly increase the speed, efficiency, and flexibility with which the predictive model is generated, tested, and utilized, and to facilitate use of the information generated by the model for a variety of purposes, generation of the predictive model as well as attendant functions such as the acquisition of process and emissions data may be implemented by one or more computer software elements designed to coordinate and execute specified functions related to generation, testing, and employment of the predictive model.

For simplification, the following describes the generation and operation of the predictive model for a single process or emissions source. It will be understood that the methodology described herein can be repeated for each process or emissions source to be monitored and controlled. The statistical hybrid method utilizes standard statistical operations on the historical training dataset (average, correlation, standard deviation, confidence, and variance) along with a fixed set of tuning coefficients that are more typically found in non-linear statistical and other advanced empirical predictive models. The resulting hybrid method uses built-in statistical SQL data processing structures and the hybrid tuning coefficients to transform the current process vector against the historical training dataset and to find predicted values. A method for deriving optimum values of the hybrid tuning coefficients from the historical training dataset is provided herein and may be used to automatically build a statistical hybrid model in the embodiment described herein.

Referring again to FIG. 4, at step 432, a change vector or delta value is calculated from each pair of time-successive measured test values of each process variable. As used herein, the term "time-successive" as applied to the measured data values is understood to mean a first measured value and the another measured value measured at a point closest in time to the first value, either before or after measurement of the first value. For each current value of the process variable, the change vector is generated by subtracting the last value of the process variable from the current value of the process variable. For example, the change vector $v_c$ for two successive measurements of a temperature parameter T would be equal to $T_t - T_{(t-\Delta t)}$ (i.e., the temperature at time t at which a first temperature measurement was taken, minus the temperature at time t-$\Delta$t when the previous temperature measurement was taken.) The change vector represents the change in a given process variable over the sampling interval. Once calculated, the calculated values of the change vector may be added to an additional data field in the data file for the process variable. Alternatively, the change vector values may be stored in another record in the relational database.

In step 433, using suitably formulated SQL statements, a value for the TSLU is then calculated for each corresponding measured value of the process variable. The TSLU is an arbitrary number representing in its simplest form, the Time Since Last Upset an operating state of the process. This simplest embodiment is an integer representing the time since the last process upset was recorded in minutes. A given model can use multiple TSLU values to delineate distinct operating modes. Another example would be if a unit has six distinct operating modes, then TSLU could be 1 through 6. Alternatively the TSLU can be defined as 1000 through 1999 for mode 1, 2000 through 2999 for mode 2, etc. with the first digits (thousands) representing the operating mode and the next three digits representing the time since last upset in the operating mode as defined previously. The TSLU allows the model to predict emissions with temporal and mode specific variability, an advancement over previous statistical (linear and non-linear) models.

If the TSLU is measured in units of sampling interval, for example, with a sampling interval of one minute, a TSLU of 3 would indicate a process change in the past equal to three times the sampling interval at which the process variable was sampled to provide test data or three minutes ago. In cases where all of the measured values of the process variable are less than the corresponding initial tolerance for the measured value, the TSLU's are set to 0. In this condition, the unit is offline. For each value of the process variable, the time since last upset is reset to 1 if the change in the process variable (from the previous measured value of the process variable to the current measured value) is greater than the initial tolerance. If there is no change in the measured value greater than or equal to the initial tolerance the time since last upset is incremented by adding 1 sampling interval to the previous value of the TSLU. In this respect, the TSLU is an indicator variable which provides a running total of the number of sampling intervals that have elapsed since the occurrence of a change in the process variable that exceeded the initial tolerance for that process variable. Successive values of the TSLU are added to a field in the data file for the process variable. Incorporation and pre-processing of the historical training dataset is now complete.

Referring to FIGS. 3b and 4, in step 434, the current version of the dataset, including the process and emissions data, the changes for each process vector, and the time since last upset is imported into the relational database as a master data table. FIG. 3b shows one example of a data structure embodied in the master data table. The data structure includes one or more data elements identifying an associated process or emissions data value, the data value itself, and associated values of the various coefficients (TSLU, delta, etc.) previously described. Other information relating to the process or emissions variable, or to a particular value of the variable, may be incorporated into the file structure as required.

In step 435, this version of the historical training dataset is then put into production and assigned a serial number which represents the number of records in the training dataset table and the date and time of the completion of importation of the dataset for use in compliance monitoring.

In step 436, correlation factor is calculated to provide a quantitative indication of a correlation between the emissions variable to be calculated and the associated process variable. In one embodiment, the correlation factor is a linear correlation coefficient As is known in the art, the correlation coefficient is a value between −1 and 1 which indicates the closeness of the relationship between two variables to a linear relationship. The closer to 0 the correlation coefficient is, the less likely there is to be a linear relationship between the two variables. Conversely, where the correlation coefficient is close to 1, there is a strong linear relationship between the two variables. The method of the present invention focuses on the relative strength of the correlation between two variables, rather than on whether the correlation between the variables is positive or negative. Thus, the absolute value of the correlation coefficient is used in the present method for evaluating the strength of the correlation. Methods for calculating the correlation coefficient using a set of values for each variable are well-known.

In addition, each variable is provided with an initial tolerance value that is stored in the configuration file with the model setup. A tolerance value is derived for each input variable from the historical data contained in training dataset by using a standard statistical function (for example, standard deviation) and scaling the variable in question relative to the remainder of the input variables. The tolerance for each input variable represents a signal-to-noise ratio for the given historical training dataset and is calculated such that a change in the input variable value equal or greater to the tolerance is significant (not just an incidental variation caused by random fluctuations in the measurement). In step 437, the standard deviation for each process variable is calculated and a tolerance for each process variable is set to a value of one-tenth of the standard deviation. This value (0.10) is called the initial global configuration parameter and can be adjusted manually or automatically by the system to maximize accuracy and resiliency to input failure. Alternatively, in cases where process variable data is available for a period of normal operations including startup and shutdown of the process, the standard deviation is computed for the measured values of the process variable over the measurement cycle, and an initial tolerance for the process variable is set to approximately one half the standard deviation. In cases where process variable data is unavailable for such a period of normal operations, the initial tolerance for the process variable is set to approximately 2.5% of the range (maximum-minimum) of the measured values of the process variable. Numerous methods for calculating the initial tolerances are contemplated, and an optimum tolerance setting may be calculated automatically based on the historical training dataset.

Increasing the number of data points for a variable in the training dataset (for example, by decreasing the sampling interval or by taking more data samples over a longer time total period) allows the value of the corresponding global configuration parameter to be decreased, resulting in increased accuracy of the model. However, there is a tradeoff when structuring the SQL statements for the predictive model in that the greater the number of data points for a parameter in the training dataset and the lower the value of the corresponding global configuration parameter, the more system resources are required to process the data at a given base sampling interval.

In step 438, following collection of the data comprising the historical training dataset, standard statistical tools are used to analyze the relationships between the process variables and the emissions variable(s) to be predicted. The variables and variable changes are categorized into groups based on the statistical correlation of the process variables to the emissions variable sought to be predicted. The process variables are classified in one of the following categories:

Load variables (LV)—A load variable is a variable that is independent of the process state and which fundamentally changes the operating profile of the emissions source when the variable experiences a change of value equal to or greater than a tolerance assigned to the variable. Load variables are set by the operator according to the load demand on the emissions source. Load variables typically fall within the top 10% of process variables having a correlation coefficient greater than 0.50 with respect to the emission variable to be predicted. Load variables are always used in generation of the predictive model, but are not needed for regulatory compliance reporting.

Critical Load variables (CLV)—A critical load variable is a variable that is either critical to predicting the value of the desired variable, or critical to the compliance reporting requirements for the emissions source. Critical Load variables are always used in generation of the model or are always needed for regulatory compliance reports. Critical Load variables also typically fall within the top 10% of process variables having a correlation coefficient greater than 0.50 with respect to the emission variable to be predicted.

Criteria variables (CV)—Criteria variables have significant correlation (relative to the other input variables) to the predicted value of desired variable. Criteria variables typically fall between the top 10% and the top 33% of process variables having a correlation coefficient greater than 0.50 with respect to the emission or other variable to be predicted. Criteria variables are used frequently in generation of the model, but are not critical for predicting the value of the emissions variable.

Non-Criteria variables (NCV)—Non-Criteria process variables are those variables which show no discernable correlation to the variable to be predicted. Non-criteria variables typically fall between the top 30% and the top 50% of process variables having a correlation coefficient greater than 0.50 with respect to the emission variable to be predicted. Non-criteria variables are sometimes used in generation of the predictive model, but are not critical for predicting the value of the emissions variable.

Process variables having correlation coefficients below 0.50 with respect to the emission variable to be predicted are not used in generation of the predictive model. Any calculated variables (for example, combustion efficiency) are categorized as restricted variables. These variables are restricted from storage in the historical database and are stored in a compliance database.

In step 440, using the data gathered for the historical training dataset, the structured query language (in source code) for the predictive model is developed. This can be done either manually or automatically by the system using the procedures and software described above.

In step 441, the predictive model for the emissions source is now fixed and ready for testing.

In step 442, a Subpart E analysis is performed on the predictive model as described in 40 CFR Part 75, Subpart E, incorporated herein by reference.

In step 443, it is determined whether the Subpart E analysis results are acceptable. In step 444, if the Subpart E analysis results are acceptable, the predictive model is put into real-time mode. In step 445, the model is certified per Federal regulations prior to utilization for compliance reporting purposes.

Figure 5:
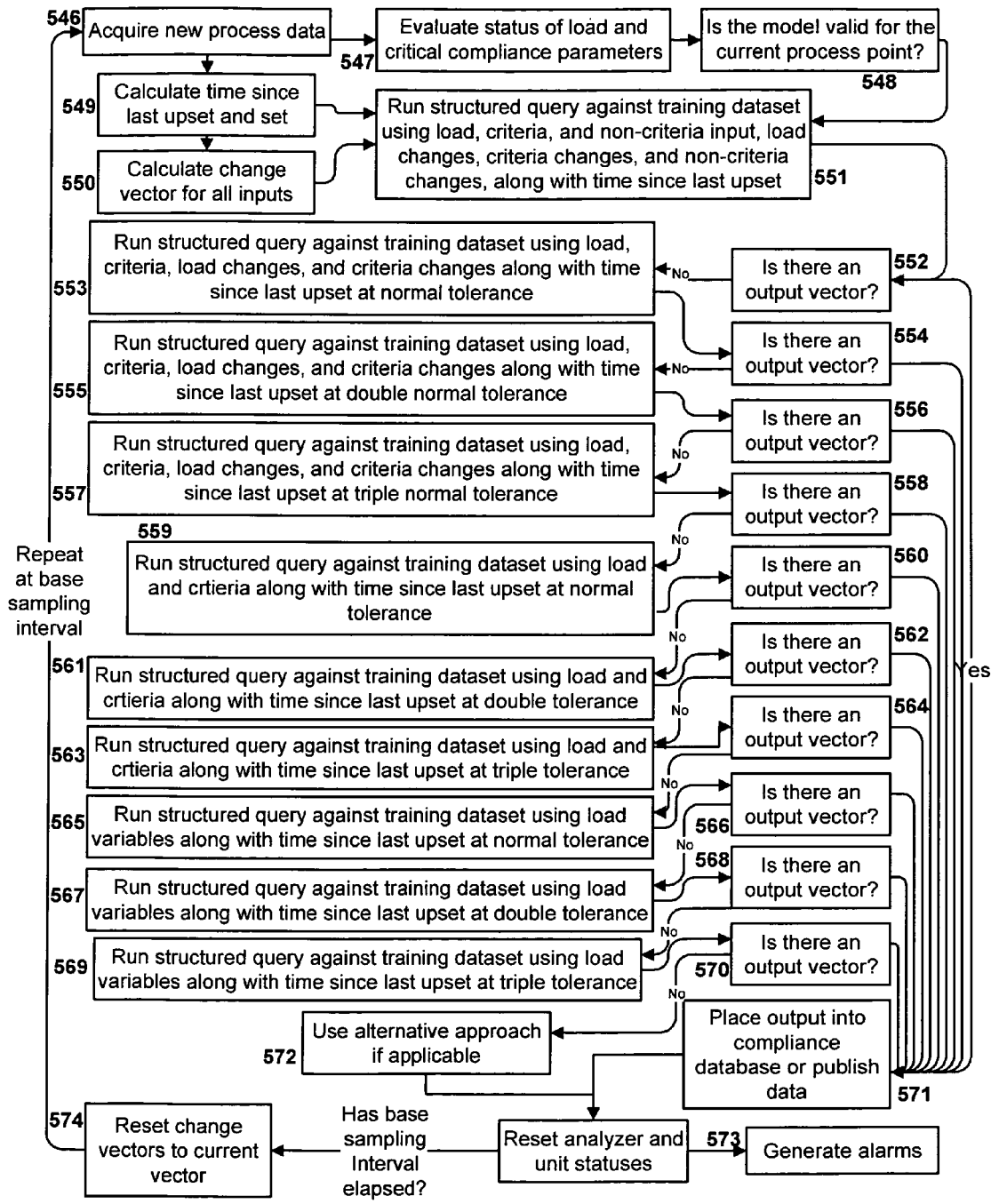
FIG. 5 illustrates a diagrammatic view of the statistical hybrid modeling system.

Referring now to FIG. 5, there is illustrated a block diagram showing operation of the predictive model as it generates predictions of emissions or process variable values. The procedure will be described for generating a prediction of a desired emissions variable based on the measured values of selected process variables. However, it will be understood that this procedure may be applied to predict a value of a process variable given simultaneously-occurring values of other process variables and one or more associated emissions variables.

At step 546, new process data is collected at the base sampling interval. This set of data provides comparison values of the variables, for comparison with the test values of the variables stored in the master data table. As the process data is acquired, it is evaluated for validity and input variables are flagged with statuses reflecting the perceived state of the input (as valid or invalid). Invalid data is not used for comparison with the model, however, other data and/or data from other process variables can typically provide enough information to generate a valid prediction if one or more of the data acquisition devices has failed and is providing invalid data.

In steps 547 and 548 values of the variables determined during model generation to be load and critical load variables (and contained in the production copy of the master data table) are evaluated to determine if the model is valid for current values of the process data. The values of these variables in the new dataset should be within the tolerances calculated and associated with these load and critical variables as compared to each record in the historical training dataset. At least a minimum number of new dataset variable values and associated coefficient values are required to be matched to corresponding records in the master data table depending on the regulatory regime the compliance monitoring system is to be deployed under.

In step 549, the TSLU's for the newly acquired process variable values are calculated, as previously described.

In step 550, the change vectors for the new set of process variable values are calculated, as previously described.

In a typical example or how the predictive model may be used, it is desired to generate a predicted value of a desired emissions variable under certain specified process conditions. The method of the present invention identifies key process variables that have the greatest impact on the value of the desired emissions variable and uses the values of these key variables under the specified process conditions as search criteria to query the master data table for a match.

It is desirable to generate the predictive model based on a sequential elimination of the least critical variables (i.e., eliminating from the search criteria, in descending order, the process variables having the lowest correlation coefficient) until a valid match is found. Thus, consideration of each input variable would be reduced to the most significant load and critical compliance variables in succession, one at a time. In one embodiment of the present invention, the process variables are grouped by significance into load, critical compliance, criteria, and non-criteria variables, as described above, which allows the predictive model to iterate through SQL statements, limiting the calls to the database to a maximum of 10 attempts. In other applications, a greater or lesser number of query attempts may be used. Using this system, common, commercially available computers (for example, personal computers) possess processor speed and database capabilities sufficient to generate valid predictions every 10 seconds at a base sampling interval of 1 minute. The most desirable solution described above would iterate through each variable potentially generating hundreds of database calls with each attempt.

In step 551, the master data table is surveyed for data values containing a match (within the associated tolerances) for each of the load variables and their associated deltas and TSLU's, each of the critical load variables and their associated deltas and TSLU's, each of the criteria variables and their associated deltas and TSLU's, each of the non-criteria variables and their associated deltas and TSLU's. The master table may be surveyed in this step and in the following steps using a structured query statement to the master data table which elicits the desired information.

In step 552, if the survey yields a positive result (i.e., a match is found), the value of the desired emissions variable corresponding to the matched value of the process variable is taken as the predicted value of the emissions variable for the current process. This value may be forwarded to a user or incorporated into a compliance database for generation of reports of other uses (step 571).

In step 553, if the first query yields a negative result (i.e., no matches are found), the query is repeated with the load variables and their associated deltas and TSLU's, and the criteria variables and their associated deltas and TSLU's at initial tolerance.

In step 554, if one or more matches are found, the value of the desired emissions variable in the master table corresponding to the matched process variable values is taken as the predicted value of the emissions variable, as described above.

In step 555, if the second query yields a negative result, a third query is generated using the load variables and their associated deltas and TSLU's, and the criteria variables and their associated deltas and TSLU's at double the initial tolerance of the variables.

In step 556, if a match is found, the predicted value of desired emissions variable is assigned as explained above.

In step 557, if the third query yields a negative result, a fourth query is generated using the load variables and their associated deltas and TSLU's, and the criteria variables and their associated deltas and TSLU's at triple initial tolerance.

In step 558, if a match is found, the predicted value of desired emissions variable is assigned as explained above.

In step 559, if the fourth query yields a negative result, a fifth query is generated using the load variables and their associated TSLU's, and the criteria variables and their associated TSLU's at initial tolerance.

In step 560, if a match is found, the predicted value of desired emissions variable is assigned as explained above.

In step 561, if the fifth query yields a negative result, a sixth query is generated using the load variables and their associated TSLU's, and the criteria variables and their associated TSLU's at double initial tolerance.

In step 562, if a match is found, the predicted value of desired emissions variable is assigned as explained above.

In step 563, if the sixth query yields a negative result, a seventh query is generated using the load variables and their associated TSLU's, and the criteria variables and their associated TSLU's at triple initial tolerance.

In step 564, if a match is found, the predicted value of desired emissions variable is assigned as explained above.

In step 565, if the seventh query yields a negative result, an eighth query is generated using the load variables and their associated TSLU's at initial tolerance.

In step 566, if a match is found, the predicted value of desired emissions variable is assigned as explained above.

In step 567, if the eighth query yields a negative result, a ninth query is generated using the load variables and their associated TSLU's at double the initial tolerance.

In step 568, if a match is found, the desired emissions variable are processed as explained above.

In step 569, if the ninth query yields a negative result, a tenth query is generated using the load variables and their associated TSLU's at triple the initial tolerance.

In step 570, if no match is found, the predictive model defaults to an alternative predictive scheme (step 572). For example, an Appendix E-type model approved by the Federal regulations as an alternative can be used at this point. Alternatively, the predictive model of the present invention may iterate through each process variable from least to most significant if the hardware and software platforms in use have sufficient capability.

When a valid prediction is achieved, it is output to the control system, the data acquisition system, or published locally where it can be reviewed for processing of alarms. The predictions are also stored in a compliance database that is not editable and maintains a continuous secure location for compliance emission data.

In step 574, the previous values of the variables are updated for the next calculation of the change vector prior to repeating at the base sampling interval. Each new process vector (each acquisition of the real-time data from the process) is processed independently. This allows the system to process either batch or continuous process data. The acquired data is sequential, in that one data value for each variable is gathered at each base sampling interval, enabling the deltas to be calculated properly. The reset is done each time the current process vector is processed. The previous values of the variables are retained only to calculate the deltas for the next record.

In one example, on a typical gas turbine application under 40 CFR Part 60, the base sampling interval is set to 1 minute and the required matches in the historical training dataset is 1 record. Each minute, the process vector is acquired and then processed into a SQL statement for comparison with the historical training dataset. The resulting output vector includes the empirical emissions data contained in the training dataset valid for the current process condition reflected in the process vector, its delta or change vector, and any associated TSLU's. The model outputs a corrected NOx concentration (in the applicable units of lbs per mmBTU) for 40 CFR Part 60, Appendix GG compliance. The model outputs are recorded in the compliance database following averaging and screening to 15 minute average blocks as required.

Element 304 of the PEM system may provide reporting capability for compliance with 40CFR Part 75 and 40CFR Part 60 regulations and EDR generation capacities. This element may support system operators, interface with data acquisition devices, and can be run from any workstation on system 20.

The model may include additional components for enhancing utility. In the embodiment shown in FIG. 2, a PEMS Alarm Generator element 303 and a PEMS License Utility element 305 are incorporated into the PEMS computing system. These additional components can optionally be provided by third parties and include a data display and alarm functionality along with report generation capabilities. These supplementary elements may optionally be installed on a separate computing device, either located onsite or remotely. These supplementary elements interact with the predictive model or database for manipulation of the compliance data into reports, graphs, real-time or historical displays.

In a particular embodiment, information generated by the predictive element of the system is used to predict an emissions profile of the system for comparison with applicable emissions standards, to evaluate compliance with those standards. The predictive information generated may also be used by process control systems to adjust process variables so as to prevent the occurrence of an out-of-compliance condition.

In another embodiment, the emissions monitoring and control system described herein includes means for providing feedback to elements of the control system (based on predetermined criteria for operation of the emissions source) for modifying system operating variables, to compensate for deviations from normal operating parameters. Control signals responsive to the predicted emissions variable values may be transmitted to the process control system(s) of the emissions source(s).

It is expressly contemplated that any number of variables including, but not limited to, carbon monoxide levels, nitrogen oxide levels, sulfurous oxide levels and oxygen could be predicted and controlled to facilitate any or all of the following: emission compliance, combustion optimization, power output maximization, emission control through power source optimization, emission control by addition of suitable agents such as nitrogen oxides, adsorbents of sulfurous oxides, steam or water. Any suitable variables for each emissions source can also be adjusted for any of the above purposes. For example, the fuel feed rate, timing, air/fuel ratio, temperature, and amount of steam injection could be varied to adjust the value of a desired emissions variable.

Any element of the PEMS system of the present invention may be stored on any suitable computer-readable storage medium (for example, CD-ROM, magnetic tape, internal or external hard drive, floppy disk(s), etc.) In addition, one or more components of the software may be transmitted or downloaded via a signal communicated over a hard-wired connection or using a wireless connection.

Figure 6:
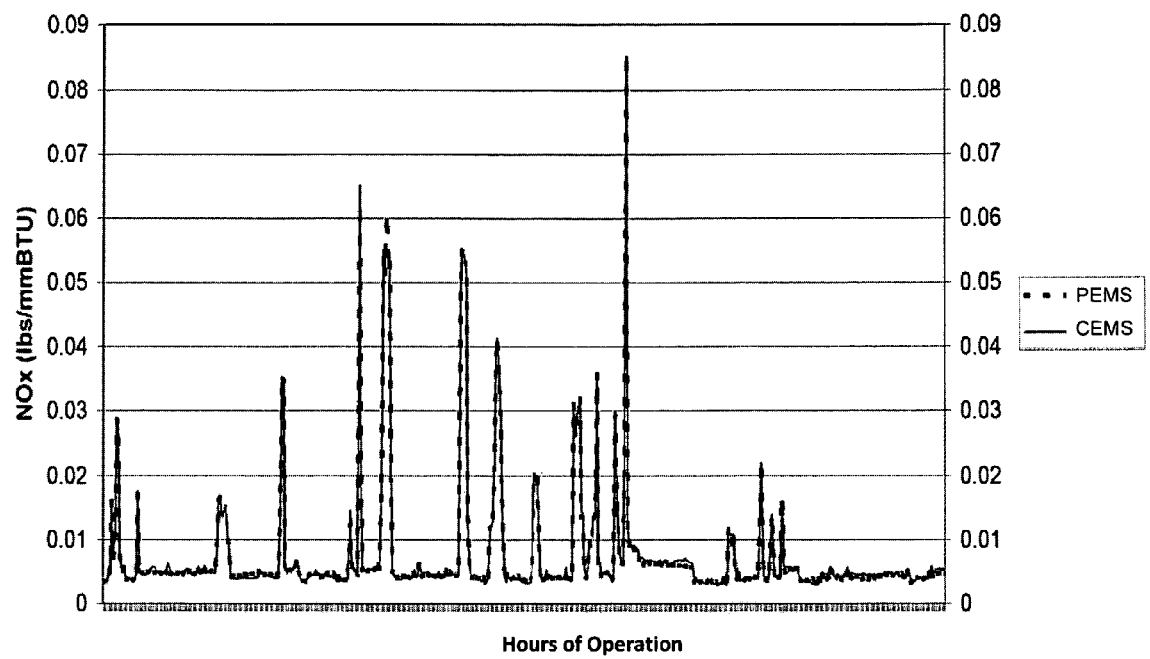
FIG. 6 illustrates a time plot of predicted versus actual pollutant emissions in a test case of a predictive model generated in accordance with the present invention.
Figure 7:
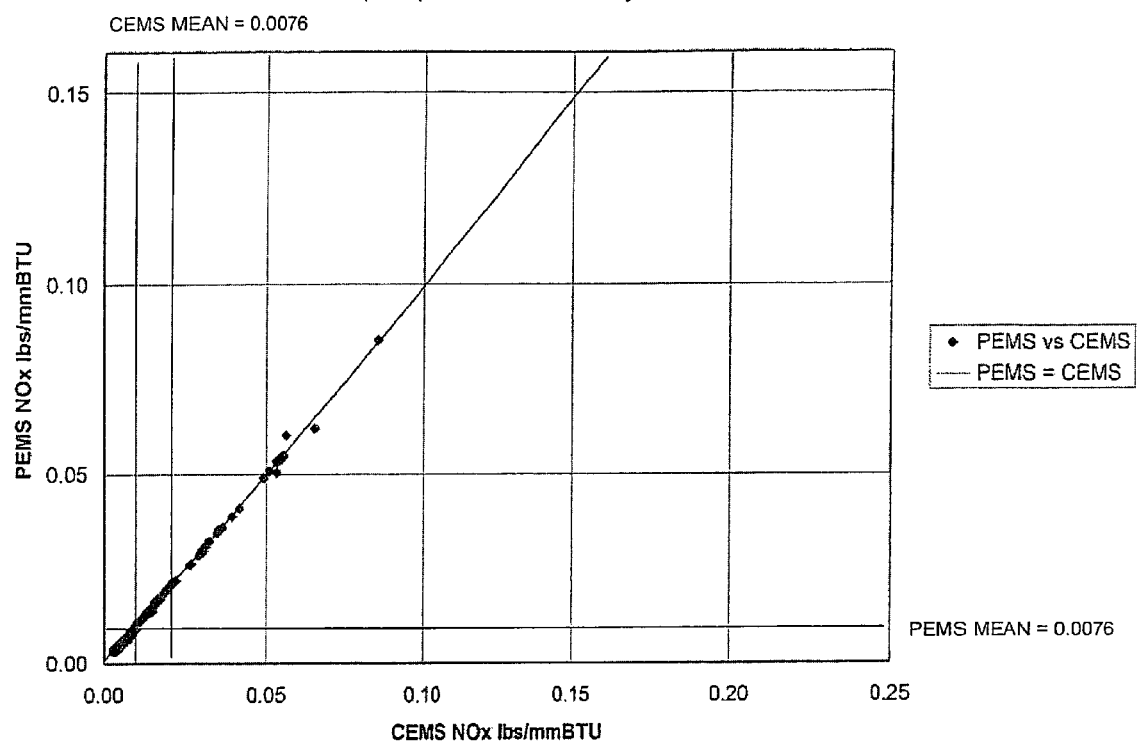
FIG. 7 illustrates a x-y plot of predicted versus actual pollutant emissions in a test case of a predictive model generated in accordance with the present invention.
Figure 8:
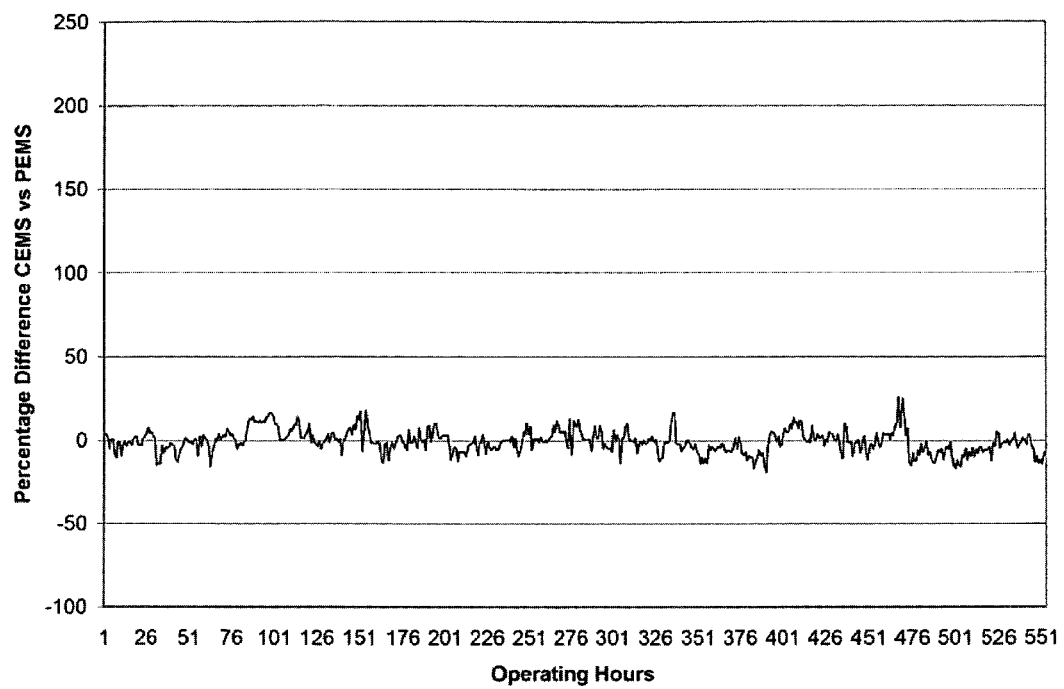
FIG. 8 illustrates a time plot of the differences between predicted versus actual pollutant emissions in a test case of a predictive model generated in accordance with the present invention.

FIGS. 6, 7, and 8 show the results of a Subpart E analysis using a predictive model generated in accordance with the present invention as applied to a gas turbine. The graphs used conform to formats found in 40 CFR Part 75, Subpart E including the time plot of the PEMS vs. CEMS data (FIG. 6), the x-y plot of the PEMS vs. CEMS hour average data (FIG. 7), and the time plot of the differences between the PEMS and CEMS (FIG. 8). Procedures for certifying PEM systems are detailed in the regulations, namely 40 CFR Part 75, Subpart E and 40 CFR Part 60, Appendix B, Performance Specification 16, incorporated herein by reference. FIGS. 6-8 show the extremely strong correlation between the predicted and actual values of NO, emissions achievable using the method described herein.

In FIG. 9, a typical data flow example is provided. The nitrogen oxides emissions from the gas-fired boiler are regulated in units of lbs of NOx per mmBTU of heat input. The formula for the calculation of NOx emission rate in the applicable standard is obtained using EPA Method 19, Equation 19-1. The model is trained using raw dry NOx ppmv and Oxygen % concentration that is used to calculate the emission rate using Equation 19-1. The constants used in formula are also provided in Method 19. The predicted NOx ppmv and Oxygen % are used to calculate the predicted NOx emission rate to be used for compliance determination.

The predictive model of the present invention can operate without a CEMS when certified as a primary continuous monitoring system for the source through a petition for approval of an alternate monitoring system (40 CFR Part 75, Subpart E) or utilizing performance specification testing as promulgated by U.S. EPA (40 CFR Part 60, PS-16 draft).

The predictive model of the present invention can be retuned at any time (periodically or continuously) using existing CEMS equipment or by mobilizing temporary or mobile emission monitoring equipment and collecting the process data concurrently.

The system and method of the present invention addresses the previously-described shortcomings of existing system. Using the methodology and software disclosed herein, a highly accurate predictive emissions model may be generated for a given emissions source by a technician having little or no understanding of the emissions source, the process run by the emissions source, or the theory or operation of the statistical hybrid model. The present invention allows owners and operators of continuous or batch processes to build and maintain accurate predictive model of the pollutant emission rates. Compared to existing systems, the system described herein is less expensive and complicated to run and maintain. In addition, no special hardware is required. Thus, a predictive model embodying a method in accordance with the present invention is unique in its ability to be developed by non-specialized staff that has no familiarity with the process, pollution control, or the methodology used by the model. In addition, users of the model and third party consultants can update the model without support of the manufacturer's engineering support. The process flow shown in FIGS. 4 and 5 is representative of a preferred mode of implementing the present invention. However, it should be understood that various modifications of the process flow could be used to provide a different level of computational flexibility, depending on the complexity of the model, needed to address various data sources and regulatory schemes. The present invention contemplates any suitable variation on this process flow.

Operation of the predictive model with respect to batch processes is almost identical to its application to continuous processes. With regard to batch processes, the TSLU is critical to proper batch predictions, but is not based on time since last upset as previously defined. In this instance, the TSLU usually is defined as the time since the start of the batch and can be compounded to include a leading integer to define the batch type or loading. Batch processing is a series of disconnected continuous operations each with a new TSLU incrementing from the beginning of the batch to its conclusion by the base sampling interval.

The application of the present invention described herein relates to predicting emissions from processes for compliance purposes. The methodology described herein may be used to develop a predictive scheme for any system comprising variables which are amenable to the correlative and statistical analyses described herein. Other applications of the invention not described herein, but considered for development include predicting weather patterns, predicting economic and financial patterns, predicting human behavior patterns among others are contemplated but have not been explored to date.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A method for generating a model representative of a process, the process including a result variable representing a product of the process, and a plurality of process variables representing characteristics of the process other than the product of the process, the method comprising the steps of:

acquiring a plurality of test values of the result variable, each test value of the plurality of result variable test values being measured at a corresponding point in time;

for each process variable of the plurality of process variables, acquiring a plurality of test values of the process variable, each test value of the plurality of process variable test values being associated with a result variable value of the plurality of result variable values, each test value of the plurality of process variable test values being measured at a point in time substantially simultaneous with a point in time at which one of the test values of the plurality of result variable test values is measured;

for each first coefficient of a plurality of first coefficients, providing a separate test value of the first coefficient associated with each process variable of the plurality of process variables, each separate test value of the first coefficient being a function of at least a portion of the test values of the plurality of test values of the associated process variable; and for each second coefficient of a plurality of second coefficients, providing a separate test value of the second coefficient associated with each test value of each process variable of the plurality of process variables, each separate test value of the second coefficient being a function of at least a portion of the test values of the plurality of test values of the associated process variable.

2. A computer system including computer readable program code means stored in an element thereof, for performing a method in accordance with claim 1.

3. A computing device including computer readable program code means stored in a memory thereof for performing a method in accordance with claim 1.

4. A non-transitory computer readable medium encoded with computer readable instructions for performing a method in accordance with claim 1.

5. A predictive emissions monitoring system comprising a non-transitory computer readable medium in accordance with claim 4.

6. A power generation system comprising:
an emissions source; and
a predictive emissions monitoring system in accordance with claim 5 operatively coupled to the emissions source.

7. An article of manufacture comprising a non-transitory computer-usable medium having computer-readable program code means embodied therein for performing a method in accordance with claim 1.

8. A computer data signal embodied in a non-transitory medium, the data signal comprising computer-readable source code for performing a method in accordance with claim 1.

9. The method of claim 1 further comprising the step of
for each process variable of the plurality of process variables, and using the plurality of test values of the process variable, calculating an associated test correlation coefficient indicating a correlation between the process variable and the characteristic.

10. The method of claim 1 further comprising the step of
for each process variable of the plurality of process variables, and using the plurality of test values of the process variable, calculating an associated test tolerance value specifying a range of values within which the test value of the process variable is located.

11. The method of claim 1 further comprising the step of
for each test value of the plurality of test values of each process variable of the plurality of process variables, calculating an associated test delta value equal to a difference between the test value and a most-recent prior time-successive test value of the plurality of test values of the process variable.

12. A method for predicting a quantitative measure of a characteristic of an emission from an emissions source, comprising the steps of:

acquiring a plurality of test values of the characteristic, each test value of the plurality of characteristic test values being measured at a corresponding point in time;

for each process variable of a plurality of process variables, acquiring a plurality of test values of the process variable, each test value of the plurality of process variable test values being associated with a test value of the plurality of first variable test values, each test value of the plurality of process variable test values being measured at a point in time substantially simultaneous with a point in time at which one of the test values of the plurality of first variable test values is measured;

for each process variable of the plurality of process variables, and using the plurality of test values of the process variable, calculating an associated test correlation coefficient indicating a correlation between the process variable and the characteristic;

for each process variable of the plurality of process variables, and using the plurality of test values of the process variable, calculating an associated test tolerance value specifying a range of values within which the test value of the process variable is located;

for each test value of the plurality of test values of each process variable of the plurality of process variables, calculating an associated test delta value equal to a difference between the test value and a most-recent prior time-successive test value of the plurality of test values of the process variable;

for each test value of the plurality of test values of each process variable of the plurality of process variables, calculating an associated test indicator variable value indicating a result of a comparison between the tolerance value associated with the process variable value and the delta value associated with the process variable value;

for each process variable of selected ones of the plurality of process variables, acquiring a plurality of comparison values of the process variable;

for each process variable of the selected ones of the plurality of process variables and using the plurality of comparison values of the process variable, calculating an associated comparison correlation coefficient indicating a correlation between the process variable and the characteristic, for each process variable of the selected ones of the plurality of process variables and using the plurality of comparison values of the process variable, calculating an associated comparison tolerance value describing a range of values within which the comparison value of the process variable is located;

for each comparison value of the plurality of comparison values of each selected one of the plurality of process variables, calculating an associated comparison delta value equal to a difference between the comparison value and a most-recent prior time-successive comparison value of the plurality of comparison values of the process variable;

for each comparison value of the plurality of comparison values of each selected one of the plurality of process variables, calculating an associated comparison indicator value indicating a result of a comparison between the tolerance value associated with the process variable value and the delta value associated with the process variable value;

for each process variable in each predetermined combination of a plurality of predetermined combinations of the selected ones of the process variables, iteratively comparing each comparison value of the variable with each test value of the variable, the comparison value of the tolerance associated with the process variable with the test value of the tolerance associated with the process variable, the comparison value of the indicator associated with the process variable with the test value of the indicator associated with the process variable, the comparison value of the delta associated with the process variable with the test value of the delta associated with the process variable, and the comparison value of the correlation coefficient associated with the process variable with the test value of the correlation coefficient associated with the process variable;

for each process variable in each predetermined combination of a plurality of predetermined combinations of the selected ones of the process variables, identifying all test values of the additional variable where the test value of the additional variable differs from a comparison value of the additional variable by an amount equal to or less than a first predetermined amount, where the test value of the delta associated with the test value of the additional variable differs from the comparison value of the delta associated with the comparison value of the additional variable by an amount equal to or less than a second predetermined amount, and where the test value of the indicator associated with the test value of the additional variable differs from the comparison value of the indicator associated with the comparison value of the additional variable by an amount equal to or less than a third predetermined amount; and assigning, as the predicted value of the emissions variable, an average of all of the test values of the emissions variable that are associated with respective test values of each process variable for which the test process variable values differ from the comparison process variable values by the associated predetermined amount.

13. A computer system including computer readable program code means stored in an element thereof, for performing a method in accordance with claim 12.

14. A non-transitory computer readable medium encoded with computer readable instructions for performing a method in accordance with claim 12.

15. A predictive emissions monitoring system comprising a non-transitory computer readable medium in accordance with claim 14.

16. A computer data signal embodied in a non-transitory computer readable medium, the data signal comprising computer-readable source code for performing a method in accordance with claim 12.

17. A non-transitory computer readable medium encoded with computer readable instructions for performing a method for predicting a value of a first variable based on values of a plurality of additional variables, the method comprising the steps of:

acquiring a plurality of test values of the first variable, each test value of the plurality of first variable test values being measured at a corresponding point in time;

for each additional variable of the plurality of additional variables, acquiring a plurality of test values of the additional variable, each value of the plurality of additional variable values being associated with a value of the plurality of first variable values, each test value of the plurality of additional variable test values being measured at a point in time substantially simultaneous with a point in time at which one of the test values of the plurality of first variable test values is measured;

for each first coefficient of a plurality of first coefficients, providing a separate test value of the first coefficient associated with each additional variable of the plurality of variables, each separate test value of the first coefficient being a function of at least a portion of the test values of the plurality of test values of the associated additional variable;

for each second coefficient of a plurality of second coefficients, providing a separate test value of the second coefficient associated with each test value of each additional variable of the plurality of variables, each separate test value of the second coefficient being a function of at least a portion of the test values of the plurality of test values of the associated additional variable;

for each selected one of a plurality of selected ones of the additional variables of the plurality of additional variables, acquiring a plurality of comparison values of the additional variable;

for each first coefficient of the plurality of first coefficients, providing a separate comparison value of the first coefficient associated with the additional variable, each separate comparison value of the first coefficient being a function of at least a portion of the comparison values of the plurality of comparison values of the associated additional variable;

for each second coefficient of the plurality of second coefficients, providing a separate comparison value of the second coefficient associated with the comparison value of each additional variable, each separate comparison value of the second coefficient being a function of at least a portion of the comparison values of the plurality of comparison values of the associated additional variable;

for each additional variable in each predetermined combination of a plurality of predetermined combinations of the selected ones of the additional variables, iteratively comparing:

each comparison value of the additional variable with each test value of the additional variable; and the comparison values of selected ones of the second coefficients associated with the comparison value of the variable with the test values of the selected ones of the second coefficients associated with the test value of the variable;

for each additional variable in each predetermined combination of a plurality of predetermined combinations of the selected ones of the additional variables, identifying all test values of the additional variable where the test value differs from a comparison value of the additional variable by an amount equal to or less than an associated predetermined amount, and where, for each of the selected ones of the second coefficients associated with each test value of the additional variable, all test values of the selected ones of the second coefficients differ from the comparison values of the selected ones of the second coefficients by an amount equal to or less than an associated predetermined amount; and assigning, as the predicted value of the first variable, an average of all of the test values of the first variable that are associated with respective test values of each additional variable for which the test first variable values differ from the comparison additional variable values by the associated predetermined amount.

18. The non-transitory computer readable medium of claim 17 wherein the computer readable medium comprises a memory in a computing device.

19. The non-transitory computer readable medium of claim 17 wherein the computer readable medium comprises a memory in a computer system.

20. The non-transitory computer readable medium of claim 17 wherein the computer readable medium comprises a compact disc.

21. A predictive emissions monitoring system comprising a non-transitory computer readable medium in accordance with claim 17.

22. A power generation system comprising:
an emissions source; and
a predictive emissions monitoring system in accordance with claim 21 operatively coupled to the emissions source.

23. An article of manufacture comprising a non-transitory computer-readable medium in accordance with claim 17.

* * * * *

UNITED STATES PATENT AND TRADEMARK OFFICE
CERTIFICATE OF CORRECTION

PATENT NO.       : 8,214,181 B2
APPLICATION NO.  : 12/228001
DATED            : July 3, 2012
INVENTOR(S)      : Swanson Page 1 of 1

It is certified that error appears in the above-identified patent and that said Letters Patent is hereby corrected as shown below:

Col. 2, Line 46,   Delete "or"

Col. 4, Line 40,   Delete "ands" and Insert --and--

Col. 11, Line 10,  Insert -- . -- after coefficient

Col. 15, Line 51,  Delete "40CFR" and Insert --40 CFR--

Col. 15, Line 51,  Delete the second "40CFR" and Insert --40 CFR--

Col. 16, Line 49,  Delete "NO," and Insert --$NO_x$--

Signed and Sealed this
Second Day of October, 2012

David J. Kappos
*Director of the United States Patent and Trademark Office*